US012691379B2

(12) United States Patent
Irwin et al.

(10) Patent No.: US 12,691,379 B2
(45) Date of Patent: Jul. 28, 2026

(54) REMOTE REAL-TIME GAME INPUT AGGREGATION

(71) Applicant: GOOGLE LLC, Mountain View, CA (US)

(72) Inventors: Collin Irwin, Mountain View, CA (US); Rachel Hausmann, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 274 days.

(21) Appl. No.: 18/035,412

(22) PCT Filed: Nov. 5, 2020

(86) PCT No.: PCT/US2020/059019
§ 371 (c)(1),
(2) Date: May 4, 2023

(87) PCT Pub. No.: WO2022/098355
PCT Pub. Date: May 12, 2022

(65) Prior Publication Data
US 2023/0415038 A1      Dec. 28, 2023

(51) Int. Cl.
*A63F 13/847* (2014.01)
*A63F 13/352* (2014.01)
(Continued)

(52) U.S. Cl.
CPC ............ *A63F 13/42* (2014.09); *A63F 13/352* (2014.09); *A63F 13/847* (2014.09); *A63F 13/86* (2014.09);
(Continued)

(58) Field of Classification Search
CPC ............................... A63F 13/847; A63F 13/42
See application file for complete search history.

(56) References Cited

U.S. PATENT DOCUMENTS 7,632,186 B2    12/2009  Spanton et al.
7,865,916 B2     1/2011  Beser et al.
(Continued)

FOREIGN PATENT DOCUMENTS

CA        2707707 A1    6/2009
CN      109348248 A     2/2019
(Continued)

OTHER PUBLICATIONS

Machine Translation of Japenese Notice of Reasons for Refusal dated Nov. 27, 2024 for JP Application No. 2023-527044 2 pages.
(Continued)

*Primary Examiner* — Jay Trent Liddle

(57)      ABSTRACT

Techniques and systems are provided for generating and displaying aggregated gaming actions based on proposed game inputs provided via each of multiple remote client devices, related to real-time display of gaining content that is based at least in part on interactions of a first user with a remote gaming device. An indication of one or more proposed game inputs is received from multiple respective remote audience users associated with the multiple remote client devices during the real-time display in response to an indicated solicitation. An aggregated game action is generated based at least in part on the multiple proposed game inputs, and an indication of the aggregated game action is provided to the remote gaming device.

35 Claims, 8 Drawing Sheets

200b

(51) Int. Cl.

| | |
|---|---|
| *A63F 13/42* | (2014.01) |
| *A63F 13/86* | (2014.01) |
| *G06F 18/23* | (2023.01) |
| *G06F 18/2413* | (2023.01) |

(52) U.S. Cl.

CPC ........ *G06F 18/23* (2023.01); *G06F 18/24137* (2023.01)

(56) References Cited

U.S. PATENT DOCUMENTS

| | | | |
|---|---|---|---|
| 8,098,905 B2 | 1/2012 | Amento et al. | |
| 8,221,241 B2 | 7/2012 | Davis et al. | |
| 8,366,552 B2 | 2/2013 | Perlman et al. | |
| 8,468,575 B2 | 6/2013 | Perlman et al. | |
| 8,549,574 B2 | 10/2013 | Perlman et al. | |
| 8,632,410 B2 | 1/2014 | Perlman et al. | |
| 8,661,496 B2 | 2/2014 | Perlman et al. | |
| 8,738,431 B2 | 5/2014 | Elliot et al. | |
| 8,832,772 B2 | 9/2014 | Perlman et al. | |
| 8,893,022 B2 | 11/2014 | Akram et al. | |
| 8,893,207 B2 | 11/2014 | Perlman et al. | |
| 9,003,461 B2 | 4/2015 | Perlman et al. | |
| 9,032,465 B2 | 5/2015 | Perlman et al. | |
| 9,324,212 B2 | 4/2016 | Fujisawa et al. | |
| 9,352,222 B2 | 5/2016 | Perlman | |
| 9,358,461 B2 | 6/2016 | Perry et al. | |
| 9,694,277 B2 | 7/2017 | Justice et al. | |
| 9,844,729 B2 | 12/2017 | Perry | |
| 10,004,993 B2* | 6/2018 | Navok ................ A63F 13/5252 | |
| 10,039,979 B2 | 8/2018 | Perry | |
| 10,055,931 B2 | 8/2018 | Greenbaum et al. | |
| 10,057,310 B1 | 8/2018 | Grunewald et al. | |
| 10,112,109 B2 | 10/2018 | Scott et al. | |
| 10,293,260 B1 | 5/2019 | Evans et al. | |
| 10,434,425 B2 | 10/2019 | Perlman et al. | |
| 10,456,671 B2 | 10/2019 | Perlman et al. | |
| 10,484,439 B2 | 11/2019 | Oates, III | |
| 10,540,699 B1 | 1/2020 | Prabhu et al. | |
| 10,543,430 B2 | 1/2020 | Osman et al. | |
| 10,596,471 B2 | 3/2020 | Eatedali et al. | |
| 10,643,492 B2 | 5/2020 | Lee et al. | |
| 10,688,390 B2 | 6/2020 | Butler et al. | |
| 10,773,168 B2 | 9/2020 | Rodgers | |
| 10,898,802 B2 | 1/2021 | Beltran et al. | |
| 10,987,596 B2 | 4/2021 | Evans et al. | |
| 11,025,971 B2 | 6/2021 | Gordon et al. | |
| 2003/0038805 A1 | 2/2003 | Wong et al. | |
| 2003/0079218 A1 | 4/2003 | Goldberg et al. | |
| 2007/0117635 A1 | 5/2007 | Spanton et al. | |
| 2009/0196516 A1 | 8/2009 | Perlman et al. | |
| 2010/0167809 A1 | 7/2010 | Perlman et al. | |
| 2011/0122063 A1 | 5/2011 | Perlman et al. | |
| 2011/0126255 A1 | 5/2011 | Perlman et al. | |
| 2011/0173574 A1 | 7/2011 | Clavin et al. | |
| 2011/0223994 A1* | 9/2011 | Yerli .................... A63F 13/843 <br> 463/31 | |
| 2011/0223996 A1* | 9/2011 | Yerli ...................... A63F 13/42 <br> 463/36 | |
| 2013/0116032 A1 | 5/2013 | Lutnick | |
| 2014/0173675 A1 | 6/2014 | Ahmed et al. | |
| 2014/0179428 A1* | 6/2014 | Miura .................... A63F 13/23 <br> 463/31 | |
| 2014/0274359 A1* | 9/2014 | Helava .................. A63F 13/35 <br> 463/29 | |
| 2015/0130813 A1 | 5/2015 | Taraki et al. | |
| 2015/0238875 A1* | 8/2015 | Fear ...................... A63F 13/355 <br> 463/33 | |
| 2016/0287984 A1 | 10/2016 | Principato et al. | |
| 2016/0294899 A1* | 10/2016 | Huang .................. A63F 13/355 | |
| 2016/0375363 A1* | 12/2016 | Connor ................. A63F 13/00 <br> 463/23 | |
| 2017/0001111 A1 | 1/2017 | Willette et al. | |
| 2017/0001112 A1 | 1/2017 | Gilmore et al. | |
| 2017/0001122 A1 | 1/2017 | Leung et al. | |

| | | | |
|---|---|---|---|
| 2017/0003784 A1 | 1/2017 | Garg et al. | |
| 2017/0072324 A1 | 3/2017 | Navok et al. | |
| 2017/0087460 A1 | 3/2017 | Perry | |
| 2017/0246544 A1 | 8/2017 | Agarwal et al. | |
| 2017/0289617 A1 | 10/2017 | Song et al. | |
| 2018/0095708 A1 | 4/2018 | Black et al. | |
| 2018/0210955 A1* | 7/2018 | Crabtree ................. H04L 67/12 | |
| 2018/0264367 A1 | 9/2018 | Cotter | |
| 2018/0316939 A1 | 11/2018 | Todd | |
| 2018/0316940 A1 | 11/2018 | Todd | |
| 2018/0316941 A1 | 11/2018 | Todd | |
| 2018/0316942 A1 | 11/2018 | Todd | |
| 2018/0316943 A1 | 11/2018 | Todd | |
| 2018/0316944 A1 | 11/2018 | Todd | |
| 2018/0316945 A1 | 11/2018 | Todd | |
| 2018/0316946 A1 | 11/2018 | Todd | |
| 2018/0316947 A1 | 11/2018 | Todd | |
| 2018/0316948 A1 | 11/2018 | Todd | |
| 2018/0322723 A1 | 11/2018 | LeMay et al. | |
| 2019/0060748 A1 | 2/2019 | Perlman | |
| 2019/0129869 A1* | 5/2019 | Murrish ................ G06F 13/102 | |
| 2019/0321725 A1 | 10/2019 | Zimring et al. | |
| 2019/0366210 A1* | 12/2019 | Beltran .................. A63F 13/335 | |
| 2019/0373322 A1 | 12/2019 | Rojas-Echenique et al. | |
| 2020/0030697 A1 | 1/2020 | Mueller et al. | |
| 2020/0139237 A1* | 5/2020 | Butler .................... A63F 13/352 | |
| 2020/0171382 A1 | 6/2020 | Agoston | |
| 2020/0179809 A1 | 6/2020 | Lin et al. | |
| 2020/0179812 A1 | 6/2020 | Trombetta et al. | |
| 2020/0230499 A1 | 7/2020 | Buser et al. | |
| 2020/0230503 A1 | 7/2020 | Smithers | |
| 2020/0238175 A1 | 7/2020 | Smullen et al. | |
| 2020/0401932 A1 | 12/2020 | Kumar et al. | |
| 2020/0406152 A1 | 12/2020 | Trombetta et al. | |
| 2021/0016190 A1 | 1/2021 | Trombetta et al. | |
| 2021/0031115 A1 | 2/2021 | Mccoy et al. | |
| 2021/0093968 A1 | 4/2021 | Mccoy et al. | |
| 2021/0093969 A1 | 4/2021 | Mccoy et al. | |
| 2021/0120295 A1 | 4/2021 | Harvey et al. | |
| 2021/0192891 A1 | 6/2021 | Greenbaum et al. | |
| 2022/0274027 A1 | 9/2022 | Fear | |

FOREIGN PATENT DOCUMENTS

| | | | |
|---|---|---|---|
| CN | 110124317 A | 8/2019 | |
| EP | 3416390 A1 | 12/2018 | |
| EP | 3511060 A1 | 7/2019 | |
| JP | 2006081895 A | 3/2006 | |
| JP | 2014018324 A | 2/2014 | |
| JP | 2017056195 A | 3/2017 | |
| JP | 2019097768 A | 6/2019 | |
| JP | 2020044136 A | 3/2020 | |
| KR | 20200080978 A | 7/2020 | |
| WO | 2010120451 A1 | 10/2010 | |
| WO | 2012064375 A1 | 5/2012 | |
| WO | 2013101382 A1 | 7/2013 | |
| WO | 2014110192 A8 | 7/2014 | |
| WO | 2016054054 A1 | 4/2016 | |
| WO | 2017004433 A1 | 1/2017 | |
| WO | 2018071781 A2 | 4/2018 | |
| WO | 2018071781 A3 | 4/2018 | |
| WO | 2018182992 A1 | 10/2018 | |
| WO | 2019068035 A1 | 4/2019 | |
| WO | 2020013963 A1 | 1/2020 | |
| WO | 2020102493 A1 | 5/2020 | |
| WO | 2020191090 A1 | 9/2020 | |
| WO | 2021112830 A1 | 6/2021 | |

OTHER PUBLICATIONS

Summarized Translation of The First Chinese Office Action mailed Mar. 15, 2025 for CN Application No. 202080106777.X, 20 pages.

International Preliminary Report on Patentability mailed May 19, 2023 for PCT/US2020/059019, 7 pages.

Japanese Office Action mailed Jun. 11, 2024 for JP Application No. 2023-527044, 6 pages, English translation.

(56) References Cited

OTHER PUBLICATIONS

International Search Report and Written Opinion mailed Aug. 2, 2021 for corresponding International Application No. PCT/US2020/059019, 12 pages.
Communication pursuant to Article 94(3) EPC mailed Jun. 4, 2025 for EP Application No. 20816735.3, 6 pages.
Machine Translation of Japanese Decision of Refusal mailed Jun. 2, 2025 for JP Application No. 2023-527044, 1 page.
Translation of Korean Allowance of Patent mailed Aug. 27, 2025 for KR Application No. 10-2023-7017859 5 pages.
Indian Examination Report mailed on Apr. 13, 2026 for IN Application No. 202347025948, 8 pages.

* cited by examiner

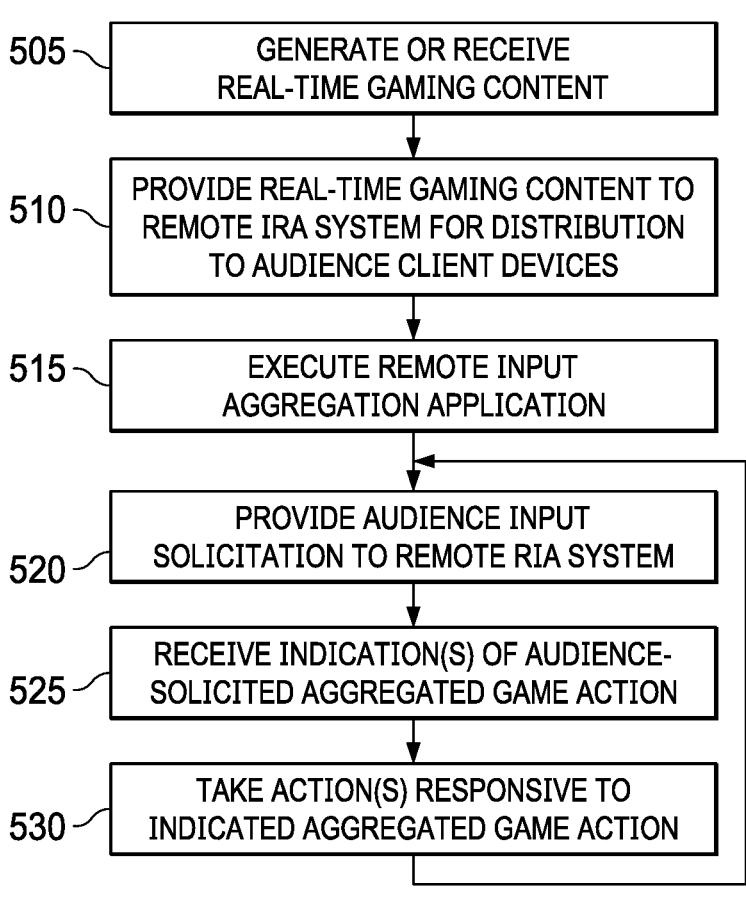

500

505 — | GENERATE OR RECEIVE
REAL-TIME GAMING CONTENT

510 — | PROVIDE REAL-TIME GAMING CONTENT TO
REMOTE IRA SYSTEM FOR DISTRIBUTION
TO AUDIENCE CLIENT DEVICES

515 — | EXECUTE REMOTE INPUT
AGGREGATION APPLICATION

520 — | PROVIDE AUDIENCE INPUT
SOLICITATION TO REMOTE RIA SYSTEM

525 — | RECEIVE INDICATION(S) OF AUDIENCE-
SOLICITED AGGREGATED GAME ACTION

530 — | TAKE ACTION(S) RESPONSIVE TO
INDICATED AGGREGATED GAME ACTION

605 DISPLAY REAL-TIME GAMING CONTENT
RECEIVED FROM REMOTE RIA SYSTEM

610 RECEIVE INDICATION OF SOLICITATION
FOR PROPOSED GAME INPUT RELATED
TO DISPLAYED GAMING CONTENT

615 RECEIVE PROPOSED GAME INPUT FROM
ASSOCIATED USER / INPUT DEVICE

620 PROVIDE INDICATION OF PROPOSED
GAME INPUT TO REMOTE RIA SYSTEM

REMOTE REAL-TIME GAME INPUT AGGREGATION

CROSS-REFERENCE TO RELATED APPLICATIONS

The present application is a U.S. National Stage under 35 U.S.C. § 371 of International Patent Application Serial No. PCT/US2020/059019, entitled "REMOTE REAL-TIME GAME INPUT AGGREGATION" and filed on Nov. 5, 2020, the entirety of which is incorporated by reference herein.

BACKGROUND

"Live streaming," or real-time transmission and display, of interactive content such as video games has become increasingly popular. Typically, one player user of a gaming system or device may enable multiple remote audience users to view a gaming session by providing those remote audience users with real-time gaming content using a video streaming service to broadcast that gaming content.

In various scenarios, such remote audience users may even provide commentary or other discourse with the player user or other members of the remote audience using to one or more textual interface elements. However, such remote audience users are uninvolved in the actual playing of the game, interaction with which is solely controlled by the player user that is local to the originating gaming system or device.

SUMMARY

To facilitate increased interaction between remote audience users and the player user actually playing an instance of a video game, techniques are described herein for enabling multiple remote audience users, viewing real-time gaming content based on the interactions of a player user with a gaming device, to provide proposed interactive inputs to that gaming device in order to "play" the relevant game along with the player user. Furthermore, the described techniques provide for a structured communication between different entities involved in providing game-content for real-time display to different remote devices in order to increase a capability for interaction between a player and remote audience users. In addition, such techniques can include utilizing a remote server to analyze those proposed game inputs in order to generate a single aggregated game action representing a plurality of game inputs provided by a large number of those remote audience members, and in certain embodiments to coordinate and distribute notifications of audience solicitation events in order to prompt the remote audience members to provide such proposed game inputs. Some or all of the techniques described herein may be performed by automated operations of an embodiment of a Remote Input Aggregation ("RIA") application of a corresponding RIA system, as discussed in greater detail below.

In certain embodiments, a proposed method may comprise providing, by a first server, gaming content for real-time display at each of a plurality of remote client devices that are each associated with a respective remote audience user, the gaming content being based at least in part on interactions of a first user with a remote gaming device; receiving, by the first server and during the real-time display, an indication of multiple proposed game inputs, the multiple proposed game inputs including one or more proposed game inputs from each of multiple client devices of the plurality of remote client devices; generating, by the first server and via a RIA application, an aggregated game action based at least in part on the multiple proposed game inputs; and providing, by the first server, an indication of the aggregated game action to the remote gaming device.

Providing the gaming content for real-time display may include providing an indication of at least some of the multiple proposed game inputs.

The gaming content may be received from the remote gaming device and may be generated by an instance of a game application being executed by the remote gaming device.

The gaming content may be received from a remote second server, and may be generated by an instance of a game application being executed by the remote second server.

Providing the gaming content for real-time display at the plurality of client devices may include modifying the gaming content to include an indication of the aggregated game action.

Providing an indication of at least some of the multiple proposed game inputs may include providing information indicative of a heat map based at least in part on at least some of the multiple proposed game inputs.

The RIA application may be configured to cause presentation of an interface overlay to appear over the game content via which interface overlay a proposed game input is retrievable. Therefore, the RIA application at the first server may trigger and control presentation of the interface overlay at the remote game devices for allowing the audience users to provide proposed game inputs.

In an exemplary embodiment, the remote input aggregation application may be configured to generate the aggregated game action by determining one or more clusters of the proposed game inputs and determining a focal point of each of the determined clusters. For example, the remote input aggregation application may be configured to determine the one or more clusters by at least one of clustering the proposed game inputs, applying a cluster selection the proposed game inputs and applying a cluster centroid calculation on the proposed game inputs.

In certain embodiments, a method may comprise: providing, by a gaming device, indications of one or more interactions of a first user with the gaming device as part of distributing gaming content generated by a game application for real-time display to a plurality of remote client devices; receiving, by the gaming device and via a remote input aggregation application executing at the gaming device, an indication of an aggregated game action that is based at least in part on multiple game inputs proposed by multiple remote audience users associated with the plurality of remote client devices; and implementing, by the gaming device, one or more actions for execution of the game application responsive to the indication of the aggregated game action.

The method may further include generating the gaming content by locally executing the game application on the gaming device.

The method may further include receiving the gaming content from a remote server executing the game application for real-time display of the gaming content to the first user.

The method may further include initiating execution of the remote input aggregation application in response to a request from the first user.

Implementing the one or more actions may include displaying one or more interface elements indicative of the aggregated game action to the first user.

The method may further include displaying to the first user one or more interface elements indicative of at least some of the multiple proposed game inputs.

Implementing the one or more actions may include performing the aggregated game action with respect to the game application as if the aggregated game action had been performed by the first user.

In certain embodiments, a method may comprise: displaying, by a client system and based at least in part on interactions of a first user with a remote gaming device, real-time gaming content received from a remote server; receiving, by the client system, one or more proposed game inputs related to the real-time gaming content from an audience user associated with the client system, the audience user being distinct from the first user; and providing to the remote server, by the client system, an indication of the one or more proposed game inputs.

Receiving the one or more proposed game inputs may include receiving at least one input from a pointing device communicatively coupled to the client system.

The one or more proposed game inputs may be received in response to a solicitation of the associated audience user for one or more gaming actions related to the gaming content, such that the solicitation is provided by the remote server during the displaying of the gaming content. 3×2×1. The method may further include receiving an indication of the solicitation via a remote input aggregation system executing on the client system.

In certain embodiments, a system may comprise a content streaming manager to provide gaming content for real-time display at each of a plurality of remote client devices that are each associated with a respective remote audience user, wherein the gaming content is based at least in part on interactions of a first user with a remote gaming device; a user input manager to receive, during the real-time display, an indication of multiple proposed game inputs, the multiple proposed game inputs including one or more proposed game inputs from each of multiple client devices of the plurality of remote client devices; and an input aggregation manager to generate an aggregated game action based at least in part on the multiple proposed game inputs, and to provide an indication of the aggregated game action to the remote gaming device.

To provide the gaming content for real-time display may include to provide an indication of at least some of the multiple proposed game inputs.

The content streaming manager may further be to receive the gaming content from the remote gaming device, and the gaming content may be generated by an instance of a game application being executed by the remote gaming device.

The content streaming manager may further be to receive the gaming content from a remote server, and the gaming content may be generated by an instance of a game application being executed by the remote server.

To provide the gaming content for real-time display may include to modify the gaming content to include an indication of the aggregated game action.

To provide the indication of at least some of the multiple proposed game inputs may include to provide information indicative of a heat map based at least in part on the at least some proposed game inputs.

In certain embodiments, a streaming server may comprise a network interface; one or more processors; and a memory storing a set of executable instructions, such that the set of executable instructions is to manipulate the one or more processors to: provide gaming content for real-time display at each of a plurality of remote client devices that are each associated with a respective remote audience user, wherein the gaming content is based at least in part on interactions of a first user with a remote gaming device; receive, during the real-time display of the gaming content, an indication of multiple proposed game inputs, the multiple proposed game inputs including one or more proposed game inputs from each of multiple client devices of the plurality of remote client devices; generate an aggregated game action based at least in part on the multiple proposed game inputs; and provide an indication of the aggregated game action to the remote gaming device.

To provide the gaming content for real-time display may include to provide an indication of at least some of the multiple proposed game inputs.

The gaming content may be received from the remote gaming device, and generated by an instance of a game application being executed by the remote gaming device.

The gaming content may be received from a remote server and generated by an instance of a game application executing on the remote server.

To provide the gaming content for real-time display may include to modify the gaming content to include an indication of the aggregated game action.

To provide an indication of at least some of the multiple proposed game inputs may include to provide information indicative of a heat map based at least in part on the at least some proposed game inputs.

In certain embodiments, a gaming device may comprise a network interface; one or more processors; and a memory storing a set of executable instructions, such that the set of executable instructions is to manipulate the one or more processors to: provide indications of one or more interactions of a first user with the gaming device as part of distributing gaming content generated by a game application for real-time display to a plurality of remote client devices; receive, via a remote input aggregation application executing at the gaming device, an indication of an aggregated game action that is based at least in part on multiple game inputs proposed by multiple remote audience users associated with the plurality of remote client devices; and implement one or more actions for execution of the game application responsive to the indication of the aggregated game action.

The set of executable instructions may further be to generate the gaming content by locally executing the game application on the gaming device.

The set of executable instructions may further be to receive the gaming content from a remote server executing the game application for real-time display of the gaming content to the first user.

The set of executable instructions may further be to initiate execution of the remote input aggregation application in response to a request from the first user.

To implement the one or more actions may include to display one or more interface elements indicative of the aggregated game action to the first user.

The set of executable instructions may further be to display to the first user one or more interface elements indicative of at least some of the multiple proposed game inputs.

To implement the one or more actions may include to perform the aggregated game action with respect to the game application as if the aggregated game action had been performed by the first user.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

FIG. 5 is a block diagram illustrating an overview of operations of one or more example gaming device computing systems communicatively coupled to an RIA system in accordance with one or more embodiments.

DETAILED DESCRIPTION

Throughout this disclosure, reference is made to content termed as being generated by and/or associated with one or more "games." It will be appreciated that as used herein, "game" or "gaming" content may include any audiovisual content that is, or is intended to be, dynamically generated or modified in response to input provided by one or more users.

Figure 1:
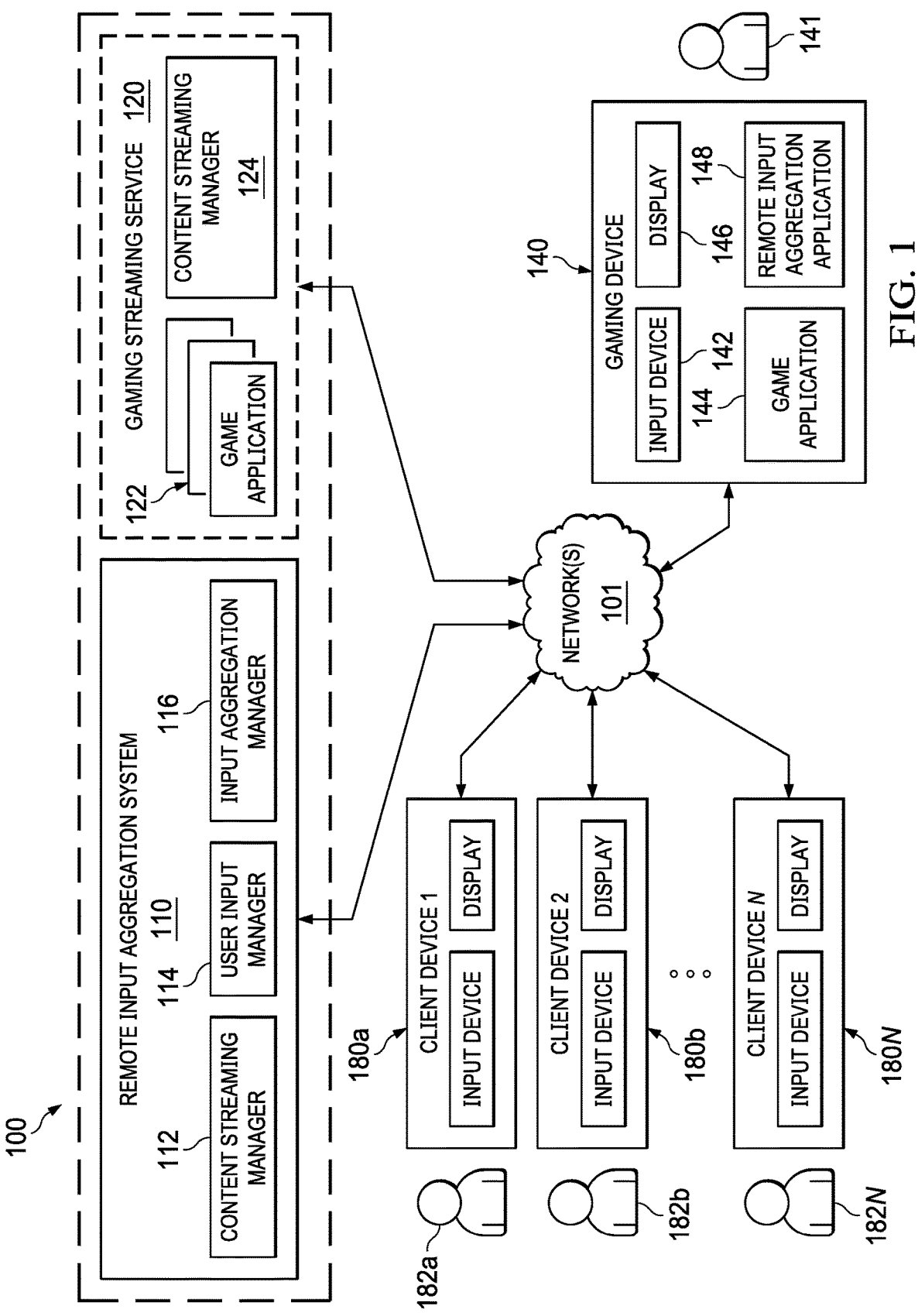
FIG. 1 is a schematic diagram of a networked environment implementing a Remote Input Aggregation (RIA) system as well as various computing systems associated with one or more users of the RIA system in accordance with one or more embodiments.

FIG. 1 illustrates a networked environment 100 that includes an example implementation of a Remote Input Aggregation ("RIA") system 110 as well as various computing systems associated with one or more users of the RIA system. In particular, the networked environment 100 includes a gaming device 140, a plurality of user client devices 180a, 180b, . . . , 180N (collectively referred to herein as client devices 180), and a game streaming service 120, all of which are communicatively coupled to the RIA system 110 via one or more networks 101. The one or more networks 101 can include any of a variety or combination of wired or wireless networks, such as a publicly accessible network of linked networks, possibly operated by various distinct parties, such as the Internet. In various implementations, the network(s) 101 may have other forms. For example, the network(s) 101 may instead be a private network, such as a corporate or university network that is wholly or partially inaccessible to non-privileged users. In still other implementations, the network(s) 101 may include both private and public networks, with one or more of the private networks having access to and/or from one or more of the public networks. In addition, in this illustrated example of FIG. 1, users may utilize client computing systems and/or other client devices to interact with the RIA system 110 to obtain various described functionality via the network(s) 101, and in doing so may provide various types of information to the RIA system 110. Moreover, in certain implementations, the various users and providers of the networked environment 100 may interact with the RIA system and/or one or more other users and providers using a private or dedicated connection.

In the depicted embodiment, the RIA system 110 includes a content streaming manager 112 to provide gaming content for real-time display via each of the client devices 180, a user input manager 114 to receive an indication of one or more proposed game inputs from a respective remote audience user (e.g., remote audience users 182a, 182b, . . . , 182N, collectively referred to herein as remote audience users 182) associated with each of the client devices 180, and an input aggregation manager 116 to generate aggregated game actions based at least in part on such proposed game inputs and to provide indications of those aggregated game actions to the communicatively coupled gaming device 140 and/or to a gaming user 141 (also referred to herein as the "player 141" or "local player 141") associated with the gaming device.

In the depicted embodiment, each of the client devices 180 includes a respective input device (such as for receiving proposed game inputs and other interactions from the associated remote audience users 182) and a respective display, such as to display real-time gaming content provided to those client devices from gaming device 140 via the RIA system 110. Similarly, gaming device 140 includes a respective input device 142 (such as for receiving gaming and other interactions from the associated player 141) and display 146, such as for displaying gaming content generated by a game application 144 executing on the gaming device or by a game application 122 executing on the game streaming service 120. In various embodiments and scenarios, the input devices associated with client devices 180 and/or input device 142 of the remote gaming device 140 may each comprise one or more input facilities, any of which may include one or more touch devices (e.g., touch screen, touch display, touch-controlled actuator, tablet, etc.), pointing devices (e.g., mouse, trackball, stylus, etc.) buttons and/or other physical actuators (e.g., keyboards), or other appropriate input facility.

Executing on the gaming device 140 is at least one instance of an RIA application 148, such as to enable the gaming device to interface and interact with the RIA system 110 in various manners. For example, in certain embodiments the RIA application 148 performs one or more operations to provide real-time gaming content from the gaming device to the RIA system for distribution to one or more of the client devices 180 (or, alternatively, to provide indications of one or more interactions of the player 141 with the gaming device, if the gaming content is generated by a game application 122 executing on the game streaming service 120); to provide indications to the RIA system of one or more solicitations for proposed game inputs from the remote audience users 182 via those client devices; to receive and display indications of aggregated game actions and/or proposed game inputs from the RIA system based on information sent to the RIA system by the client devices 180; etc. In various embodiments, the player 141 requests initialization and/or execution of the RIA application 148. In at least one embodiment, the player may locally initiate execution and/or initialization of the RIA application. In addition, in certain embodiments the RIA system 110 may automatically initiate execution of the RIA application 148 on the gaming device 140, such as upon detection of a request from the gaming device or from the game streaming service 120 to begin broadcasting real-time gaming content to one or more of the client devices 180 via the RIA system, or otherwise in accordance with user preferences associated with the gaming device and/or the player user.

In the illustrated embodiment of FIG. 1, game streaming service 120 (e.g., Google Stadia®) may also provide real-time gaming content to the gaming device 140 and/or the RIA system 110 via a content streaming manager 124 and network(s) 101, such as may be generated by the game streaming service via one of multiple game applications 122. For example, in various scenarios, player 141 may elect to subscribe on a recurring basis to the game streaming service, such as to play one or more of the game applications 122 that the player does not own. In such scenarios, the player 141 interacts with gaming device 140 via input device(s) 142 in response to the real-time gaming content received from the game streaming service and presented via display 146 as if the gaming device were locally executing a game application 144; indications of such interactions are provided to and processed by the game streaming service rather than to/by any locally executed game application.

In the depicted embodiment, the real-time gaming content is provided to the RIA system 110 for distribution to one or more of the remote audience users 182 via client devices 180 regardless of whether such real-time gaming content is generated locally by the gaming device via execution of a game application 144, or received from the game streaming service 120 as part of executing one of multiple game applications 122.

In various embodiments, the game streaming service 120 may be either distinct from, or integrated with, the RIA system 110. Similarly, in one or more scenarios in which the game streaming service 120 may be distinct from the RIA system 110, the game streaming service and RIA system may nonetheless be operated by a common entity.

During operation, the RIA system 110 may perform various interactions via network(s) 101 with the gaming device 140 and/or with one or more of client devices 180. As an example, the RIA system 110 may receive real-time gaming content information from the remote gaming device 140 or from the game streaming service 120 based at least in part on interactions of the player 141 with the gaming device; provide that gaming content for real-time display via each of multiple of the client devices 180; receive indications of audience input solicitations from the gaming to device; provide those or other indications of such audience input solicitations to the multiple client devices in order to solicit proposed game inputs from the remote audience users 182; receive an indication of one or more proposed game inputs from each of multiple remote audience users respectively associated with multiple of the client devices, such as in response to an indicated audience input solicitation; analyze multiple proposed game inputs received from the client devices in order to generate an aggregated game action based at least in part on those proposed game inputs; provide an indication of an aggregated game action to the gaming device, such as to cause display of one or more indications of the aggregated game action to the player associated with the gaming device, and/or to cause the remote gaming device to respond to the aggregated game action as if the aggregated game action was performed by the player; provide information indicative of at least some of the received proposed game inputs to the gaming device, such as to cause display of one or more indications of those proposed game inputs to the player associated with the gaming device.

During operation, the remote gaming device 140 may perform various interactions via network(s) 101 with the RIA system 110 and/or one or more of client devices 180, including to initiate the provision of real-time gaming content to the RIA system that is either locally generated via game application 144 or generated remotely by game streaming service 120 via a game application 122. In addition, various interactions may be performed by the remote gaming device 140 via the RIA application 148 executing on the remote gaming device. As an example of such interactions, an RIA application executing on the remote gaming device may generate one or more audience input solicitations, and provide indications of those audience input solicitations to the RIA system 110 in order to solicit proposed game inputs from the remote audience users 182 via client devices 180; may receive from the RIA system an indication of an aggregated game action that is based at least in part on multiple such proposed game inputs; and may take one or more actions responsive to the received indication of such an aggregated game action. In certain embodiments, the RIA application may cause presentation of an interface overlay to appear, either visually or transparently, over gaming content generated by local game application 144 or a remote game application 122, either independently or in conjunction with the RIA system 110. In such embodiments, the interface overlay may enable collection and display of proposed game inputs from the client devices 180, such as providing one or more user interface elements to enable the player 141 to initiate an audience input solicitation, and/or to display one or more results of an audience input solicitation via the RIA application 148. In certain embodiments, the interface overlay may further enable the RIA application to directly interact with the gaming device 140, such as to present an aggregated game action generated by the RIA system 110 to the gaming device as if the aggregated game action had been performed by the player 141.

Actions that the RIA application 148 may cause to be performed by the remote gaming device 140 responsive to an indicated aggregated game action may include, in various embodiments: to display one or more indications of the aggregated game action to the player 141 via display 146; to display one or more indications of the aggregated game action to the client devices 180, such as by replicating the indications displayed to the player 141 within the real-time gaming content provided to the RIA system 110; to execute the aggregated game action within the game application 144 (or a remote game application 122 via game streaming service 120), such as if the aggregated game action had been performed by the player 141; etc. In addition, the RIA application 148 may cause the remote gaming device 140 to take one or more actions responsive to an indication of multiple proposed game inputs received from the RIA system 110, such as to display a heat map or other visual indication of such proposed game inputs to the player 141, and/or to client devices 180, such as by replicating the indications displayed to the player 141 within the real-time gaming content provided to the RIA system 110.

During operation, each of the client devices 180 may perform various interactions via networks 101 with the RIA system 110 and/or with the remote gaming device 140. In various embodiments, such interactions may include receiving information indicative of real-time gaming content from the RIA system; receiving information indicative of an audience input solicitation from the RIA system; providing an indication to the RIA system of one or more proposed game inputs received via an input device from a remote audience user associated with the client device, such as in response to an indicated audience input solicitation; or other interaction.

The interactions of the RIA system 110 with the remote gaming device 140, the game streaming service 120, and/or audience user client devices 180 may occur in various ways, such as in an interactive manner via a graphical user interface (not shown) provided by the RIA system to users of the remote gaming device, game streaming service, and/or client devices via at least some Web pages of a RIA system Web site. In certain embodiments, information provided to or by the Web site may also be provided in a programmatic manner by one or more client software applications via an Application Program Interface ("API," not shown) provided by the RIA system that allows computing systems and/or application programs (e.g., RIA application 148) to invoke such functionality programmatically, such as using Web services or other network communication protocols. In the illustrated implementation, various interactions between the RIA system and the remote gaming device 140, game streaming service 120, and audience client devices 180 may be performed using a web browser (not shown) or RIA application 148, each of which may respectively be executing on the associated gaming device or client device. As used herein, either or both of the remote gaming device 140 and client devices 180 may be fixed or mobile, and may include instances of various computing devices such as, without limitation, desktop or other computers (e.g., tablets, slates, etc.), database servers, network storage devices and other network devices, smart phones and other cell phones, smart watches or other wearable devices, consumer electronics, digital music player devices, standalone or portable gaming devices, PDAs, pagers, electronic organizers, Internet appliances, and various other consumer products that include appropriate communication capabilities.

Figure 2A:
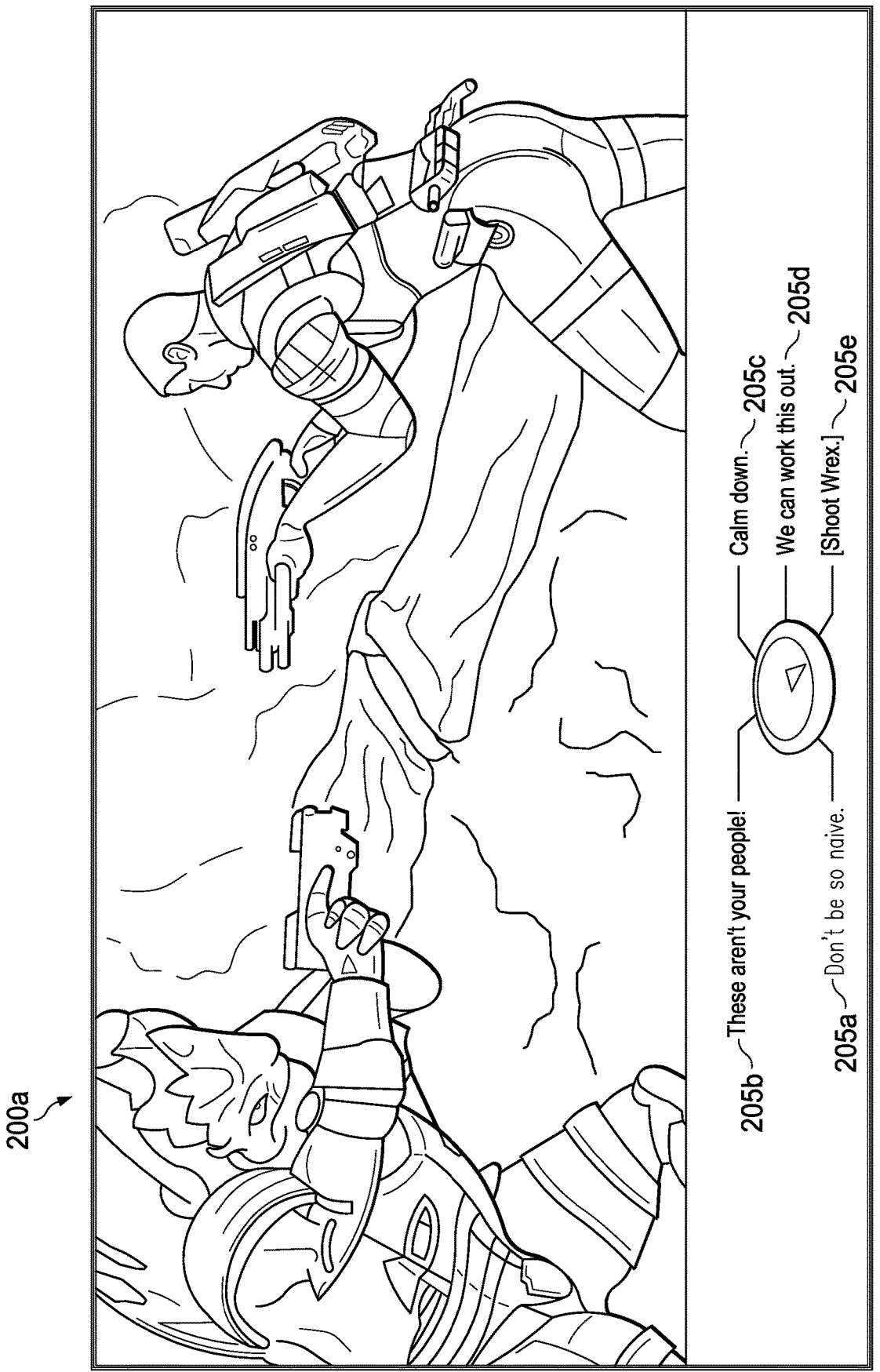
FIGS. 2A through 2C illustrate example graphical user gaming interfaces in accordance with one or more embodiments.
Figure 2B:
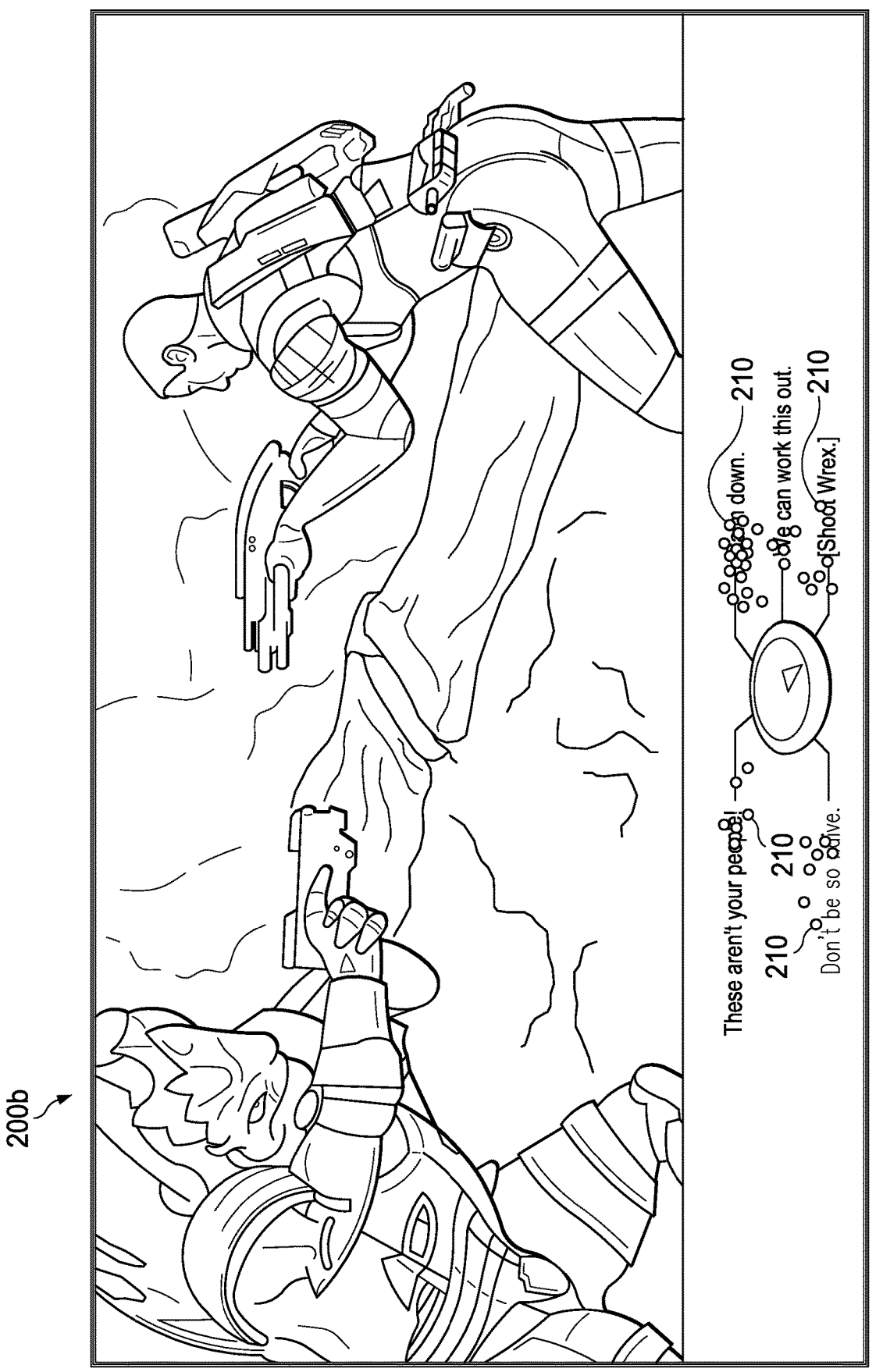
Figure 2C:
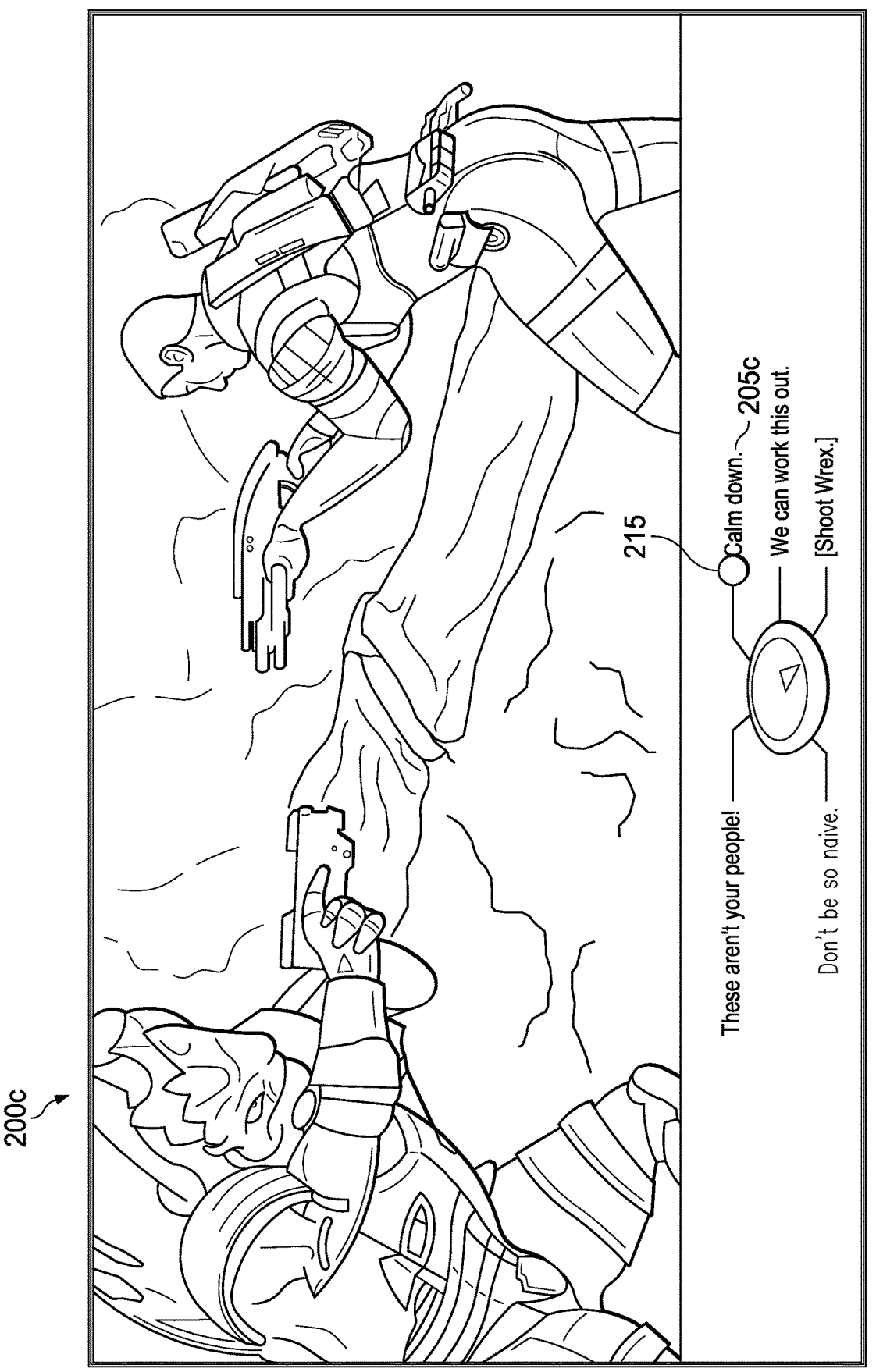

FIGS. 2A-2C illustrate an example gaming graphical user interfaces (GUIs) in accordance with one or more embodiments.

FIG. 2A depicts an example gaming GUI 200a, such as may be generated by gaming device 140 of FIG. 1 as part of executing game application 144 or, alternatively, provided to the gaming device 140 by game streaming service 120 as part of executing a game application 122. In either case, the gaming GUI 200a comprises a portion of real-time gaming content provided to an RIA system for real-time distribution to a plurality of remote audience users via one or more communication networks and remote audience users' respectively associated client devices. In the depicted embodiment, the gaming GUI 200a presents a selection of available game actions 205a-205e, such as may be available to a player of the associated game application at various times and/or circumstances during gameplay. During typical gameplay, a player associated with (and typically local to) the gaming device selects one of the available game actions in order to cause the game application to respond to that selection accordingly, such as by responsively generating additional gaming content based on the particular selection made.

Here, the player user associated with the gaming device may instead cause the gaming device to generate (such as via a RIA application executing on the gaming device) a solicitation for audience input to determine which of the available game actions 205 to select. Such solicitations may be generated and provided to the RIA system in a variety of manners. In various embodiments the RIA application may: present one or more user interface elements to the player, either in response to certain criteria or otherwise, and may generate an audience input solicitation based on interactions of the player with the presented user interface elements; automatically generate an audience input solicitation based on one or more player interactions with the relevant game application, such as in response to one or more predefined player interactions and/or in response to a pause in such interactions, such as if the player is presented with available game actions 205 and does not select one of those available game actions within a defined period of time; determine to present one or more user interface elements to the player in order to prompt the player as to whether a solicitation should be sent, such as in response to similar criteria as that discussed above with respect to automatically generating an audience input solicitation; or other manner.

In a streaming audience scenario, the gaming GUI 200a is also "streamed" or otherwise presented to multiple remote audience users as part of real-time gaming content provided to those remote audience users' respective client devices by the RIA system. As part of that presentation, and responsive to an audience input solicitation provided from the gaming device to the RIA system, the RIA system further provides an indication of an audience input solicitation to the remote client devices viewing the real-time gaming content. In various embodiments, the manner in which the remote audience users are notified of an audience input solicitation may vary. In various embodiments, the RIA system may provide one or more audiovisual indications of an audience input solicitation, such as by providing one or more user interface elements to the remote audience users; by making one or more modifications to the real-time gaming content; or in some other manner. In certain embodiments, the indications of the audience input solicitation may include an indicated timer or other "timeout" facility, indicating a deadline by which a remote audience member must provide (such as via an input device associated with the user's client device) a proposed game input. In certain embodiments, the manner in which a particular remote audience user is notified of an audience input solicitation may be based at least in part on one or more preferences selected by the player associated with the originating gaming device, and/or associated with that remote audience user.

FIG. 2B depicts an example gaming GUI 200b, such as may comprise a portion of the real-time gaming content provided subsequent to the gaming GUI 200a of FIG. 2A. In the depicted embodiment, the gaming GUI 200b presents the available game actions 205, but also presents visual indications of multiple proposed game inputs 210 submitted by the multiple remote audience users via their respectively associated client devices. In certain embodiments, each of the depicted proposed game inputs 210 may correspond to a single proposed game input received from a single client device; in other embodiments, each of the depicted proposed game inputs may correspond to multiple such proposed game inputs received, such as if the RIA system determines to provide intermediate indicia of a large volume of those proposed game inputs. In such embodiments, the RIA system may aggregate a subset of proposed game inputs received from the relevant client devices in order to reduce the total number of audiovisual indications presented to the player user.

In at least some embodiments, the depicted proposed game inputs 210 may be displayed to the player user associated with the remote gaming device via an overlay generated by a local RIA application executing on the remote gaming device. In addition, the depicted proposed game inputs 210 may be displayed to one or more of the remote audience users via their associated client devices, such as if the RIA system includes indications of those proposed game inputs in the real-time gaming content it provides to those client devices. For the sake of simplicity, the depicted embodiment presents the proposed game inputs 210 in a monochromatic format; however, it will be appreciated that a variety of audiovisual indications may be used to display one or more of the proposed game inputs, including various forms of "heat maps" in which disparate colors, sizes, shapes, or other graphical effects may be utilized in order to convey a density or popularity of locations within the depicted gaming GUI that correspond to proposed game inputs received from audience members' client devices. In various embodiments, the extent and manner to which the proposed game inputs 210 are displayed may be determined based at least in part on one or more preferences of the player user associated with the remote gaming device, one or more preferences of a respective audience user, and/or with configuration parameters of the RIA system itself.

FIG. 2C depicts a gaming GUI 200c, which again may comprise a portion of the real-time gaming content provided subsequent to the gaming GUI 200a of FIG. 2A. In the depicted embodiment, the gaming GUI 200c presents the available game actions 205, but also presents a visual indication 215 of an aggregated game action generated by the RIA system. In particular, in the depicted embodiment the aggregated game action indicates that the most popular available game action, as determined by the RIA system based on the proposed game inputs received from multiple client devices, is available game action 205c. In various embodiments, the RIA system may utilize various techniques in order to determine the aggregated game action based on proposed game inputs received from the multiple client devices. In various embodiments, the RIA system may utilize one or more of clustering, cluster selection, and cluster centroid calculation to determine one or more clusters of proposed game inputs, as well as to determine a center point (centroid) or other focal point of each of those determined clusters; moreover, in various embodiments the RIA system may utilize one or more machine learning techniques based on historical inputs to determine an available game action associated with each of one or more groups of proposed game inputs received from the client devices. As with the visual indicia of proposed game inputs 210 of FIG. 2B, it will be appreciated that a variety of audiovisual devices may be used to indicate the aggregated game action to the player user of the remote gaming device and/or to the audience users associated with the relevant client devices from which proposed game inputs were solicited.

It will be appreciated that the GUIs and other information presented with respect to FIGS. 2A-2C are included for illustrative purposes, and that such information and/or associated functionality may be presented or otherwise provided in other manners in other embodiments. In addition, it will be appreciated that GUIs and other information presented to users may vary with the type of client device used by the user, such as to present less information and/or functionality via client devices with smaller display screens and/or less ability to present information to or obtain input from the user, such as under control of a mobile application of a RIA system interface executing on the client device, or otherwise based on information sent to the client device from the RIA system and/or remote gaming device.

Figure 3:
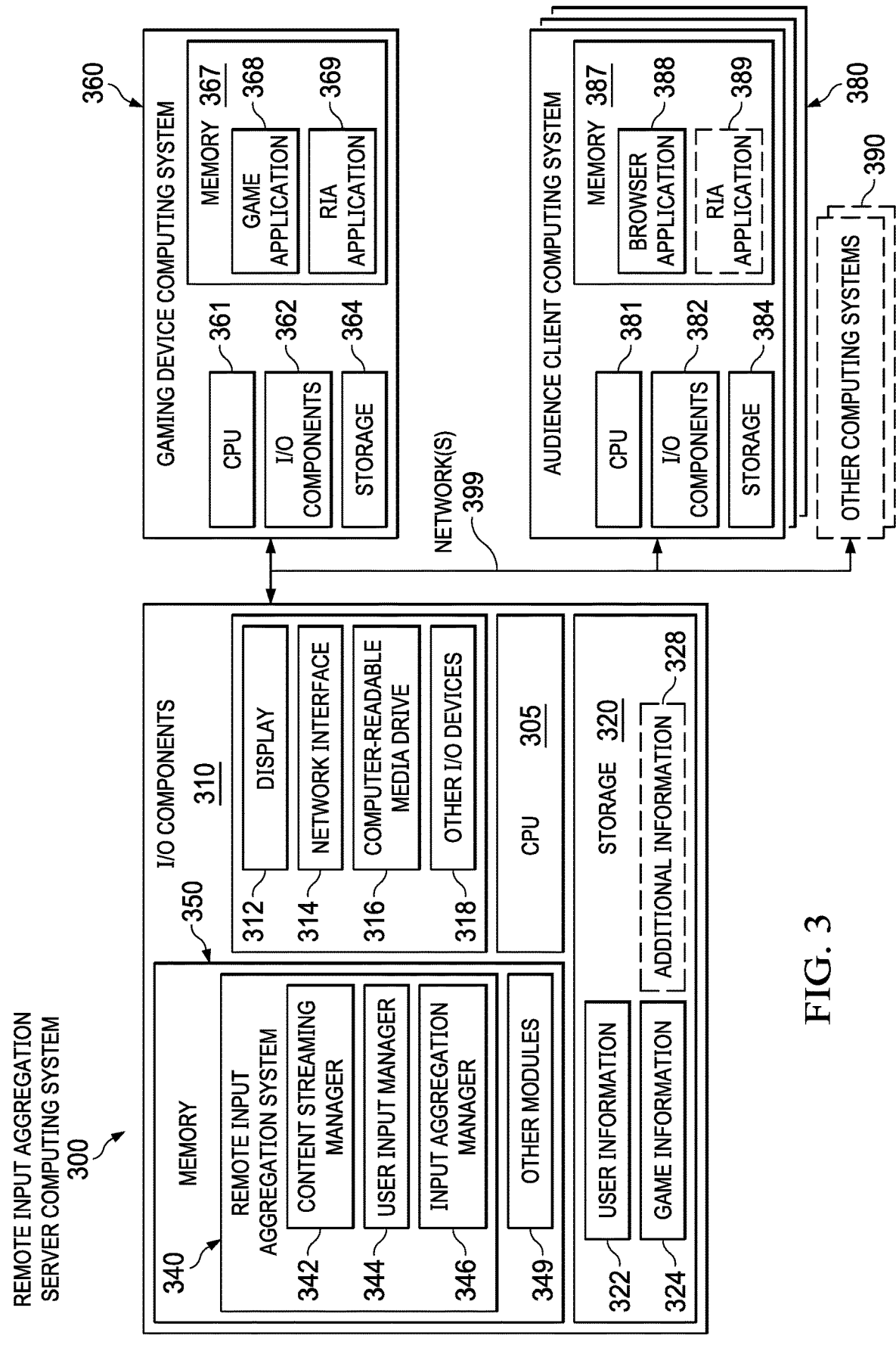
FIG. 3 is a block diagram illustrating an example computing system configured for executing an RIA system in accordance with one or more embodiments.

FIG. 3 is a block diagram illustrating component-level functionality provided by a plurality of electronic circuits that, when in combined operation, are suitable for performing and configured to perform at least some of the techniques described herein. In the particular implementation depicted, the plurality of electronic circuits is at least partially housed within a server computing system 300 executing an implementation of a Remote Input Aggregation (RIA) system 340. The RIA server computing system 300 includes one or more central processing units ("CPU") or other processors 305, various input/output ("I/O") components 310, storage 320, and memory 350, with the illustrated I/O components including a display 312, a network interface 314, a computer-readable media drive 316, and other I/O devices 318 (e.g., keyboards, mice or other pointing devices, microphones, speakers, GPS receivers, etc.). The server computing system 300 and RIA system 340 may communicate with other computing systems via one or more networks 399 (e.g., the Internet, one or more cellular telephone networks, etc.), such as gaming device computing system 360, audience client computing systems 380, and other computing systems 390. It will be appreciated that the gaming device computing system 360, along with some or all of the audience client computing systems 380 and other computing systems 390, may similarly include some or all of the types of components illustrated for RIA server computing system 300 (e.g., to have a RIA system client application 369/389 respectively executing in memory 367 of the gaming device computing system 360 or to memory 387 of audience client computing systems 380 in a manner analogous to the RIA system 340 executing in memory 350). In particular, the operations and functionality provided by CPU 361 and 381 may, in certain embodiments, be analogous to those of CPU 305; similarly, the operations and functionality provided by I/O components 362 and 382 may be analogous to those of I/O components 310, and the operations and functionality provided by storage components 364 and 384 may be analogous to those provided by storage 320. In the depicted embodiment, each audience client computing system 380 may interact with the RIA server computing system 300, including to display real-time gaming content and provide indications of proposed game inputs, via a browser application 388 executing in memory 387 of the respective client computing system.

In the illustrated embodiment, an embodiment of the RIA system 340 executes in memory 350 in order to perform at least some of the described techniques, such as by using the processor(s) 305 to execute software instructions of the system 340 in a manner that configures the processor(s) 305 and RIA server computing system 300 to perform automated operations that implement those described techniques. As part of such automated operations, the RIA system 340 and/or other programs or modules 349 executing in memory 330 may store and/or retrieve various types of data, including in data structures of storage 320. In this example, the data used may include various types of user information in database ("DB") 322, various types of game information (e.g., historical records of audience input solicitation and resulting proposed game inputs associated with one or more game applications, such as for use in training machine intelligence operations for subsequent generation of aggregated game actions) in DB 324, and/or various types of additional information 328, such as various analytical or other information related to one or more devices or services associated with the RIA system.

It will be appreciated that the RIA server computing system 300, as well as the other systems and devices included within FIG. 3, are merely illustrative and are not intended to limit the scope of the present disclosure. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, biometric monitoring devices, digital music player devices, standalone or portable gaming devices, PDAs, wireless phones, Internet appliances, and various other consumer products that include appropriate communication capabilities. In addition, the functionality provided by the illustrated RIA system 340 may in some embodiments be distributed in various modules. Similarly, in some embodiments, some of the functionality of the RIA system 340 may not be provided and/or other additional functionality may be available. In addition, in certain implementations various functionality of the RIA system may be provided by third-party partners of an operator of the RIA system. For example, data collected by the RIA system may be provided to a third party for analysis and/or metric generation.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the RIA system 340 and/or RIA application software executing on gaming device computing system 360 and/or audience client computing systems 380) and/or data structures, such as by execution of software instructions of the one or more software programs and/or by storage of such software instructions and/or data structures. Furthermore, in some embodiments, some or all of the systems and/or modules may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
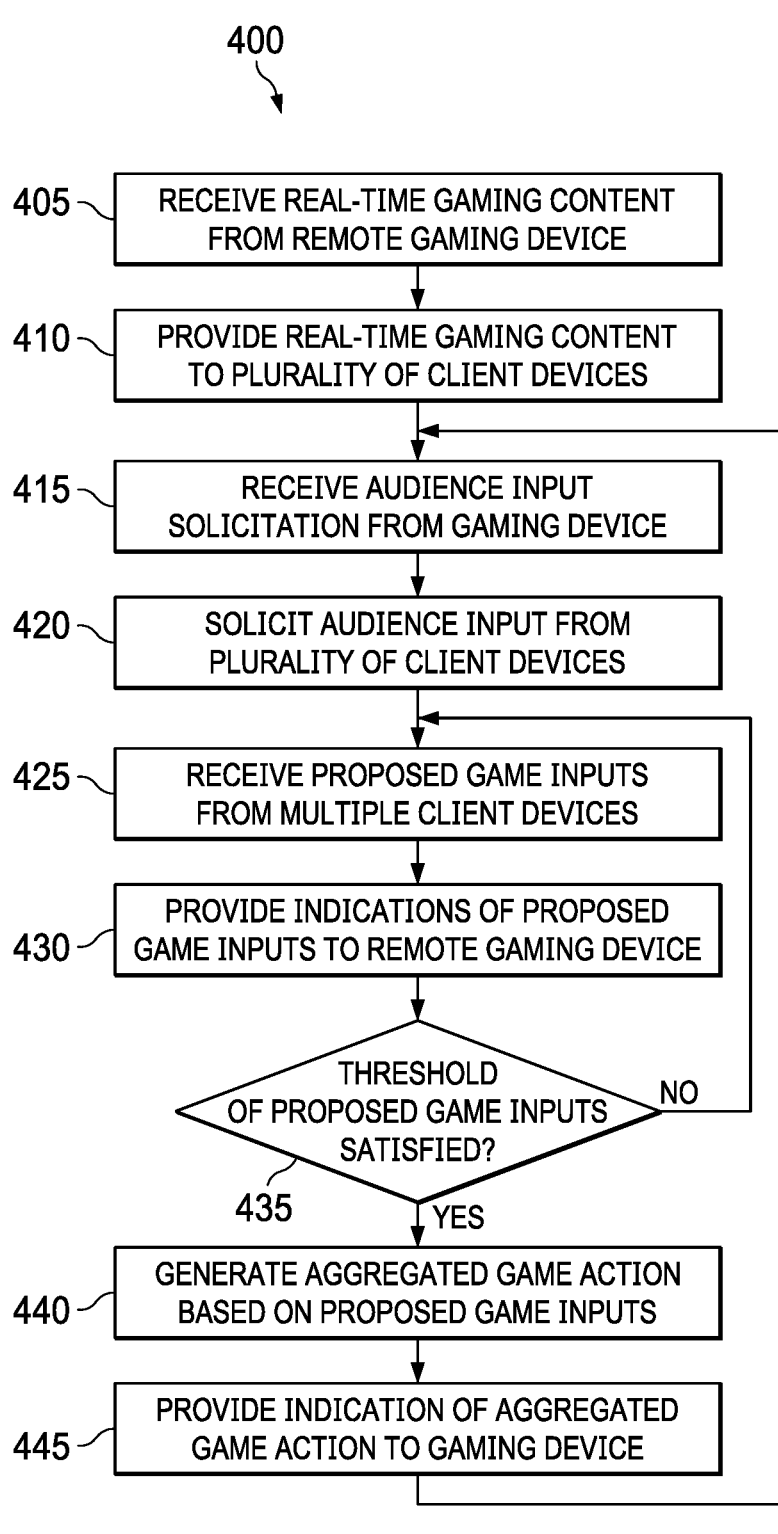
FIG. 4 is a block diagram illustrating an overview of operations of an RIA system in accordance with one or more embodiments.

FIG. 4 is a block diagram illustrating an overview of an operational routine 400 of an RIA system in accordance with one or more techniques described herein. The routine may be performed, for example, by RIA system 110 of FIG. 1, by RIA server computing system 300 of FIG. 3, or by some other embodiment.

The routine begins at block 405, in which the RIA system receives real-time gaming content from a remote gaming device (e.g., gaming device 140 of FIG. 1 or gaming device computing system 360 of FIG. 3) or game streaming service (e.g., game streaming service 120 of FIG. 1) via one or more communication networks. The routine proceeds to block 410, in which the RIA system provides the real-time gaming content to a plurality of client devices, such as client devices 180 of FIG. 1, audience client computing systems 380 of FIG. 3, or other client devices. The routine then proceeds to block 415.

At block 415, the RIA system receives information indicative of an audience input solicitation from the remote gaming device. The routine proceeds to block 420, in which the RIA device, responsive to the audience input solicitation, solicits audience input from the plurality of client devices. This may for example include transmitting an input request to the plurality of client devices. In addition, a timer of the RIA system may be started defining a period of time in which proposed game inputs may be received and processed from the client devices. After the timer has expired game inputs at the client devices are no longer retrieved and processed by the RIA system. The routine then proceeds to block 425.

At block 425, the RIA system receives proposed game inputs from multiple client devices of the plurality of client devices. In the depicted embodiment, the routine then proceeds to block 430, in which the RIA system provides information indicative of at least some of the proposed game inputs to the remote gaming device, such as to cause the remote gaming device to display one or more audiovisual indications of those proposed game inputs (e.g., a heat map or other audiovisual indication). The routine proceeds to block 435.

At block 435, the RIA system determines whether a defined threshold of proposed game inputs has been satisfied. For example, in certain embodiments the RIA system may allow proposed game inputs to be submitted by the relevant client devices for a defined period of time; until a defined quantity of proposed game inputs have been received; or until some other defined threshold has been satisfied. In certain embodiments, such thresholds may be defined by one or more preferences of a player user associated with the remote gaming device, and/or defined as part of RIA system configuration. If the defined threshold of proposed game inputs has not been satisfied, the routine returns to block 425.

Once the defined threshold of proposed game inputs has been satisfied, the routine proceeds to block 440, in which the RIA system analyzes the proposed game inputs received from the client devices in order to generate an aggregated game action based on the proposed game inputs. As discussed in greater detail herein, in certain embodiments the aggregated game action may be generated in various manners. In various embodiments, the RIA system may generate an aggregated game action via one or more operations that include machine learning based on historical input, clustering, cluster selection, and/or cluster center calculation.

Once the RIA system has generated the aggregated game action, the routine proceeds to block 445, in which the RIA system provides information indicative of the aggregated game action to the remote gaming device, such as to cause the remote gaming device to take one or more actions responsive to the aggregated game action. For example, in certain embodiments, such actions may include to implement and respond to the aggregated game action as if the aggregated game action was performed by a player user associated with the remote gaming device, or to display one or more audiovisual indications of the aggregated game action to the player user.

The routine then returns to block 415, in which the RIA system awaits an additional audience input solicitation from the remote gaming device while providing the real-time gaming content to the plurality of client devices for display.

FIG. 5 is a block diagram illustrating an operational routine 500 of an example gaming device in accordance with one or more embodiments. The routine may be performed, for example, by remote gaming device 140 of FIG. 1, by the gaming device computing system 360 of FIG. 3, or some other gaming device.

The routine 500 begins at block 505, in which the gaming device generates or receives real-time gaming content during a game session. As detailed herein, in certain embodiments and scenarios the gaming device may generate the real-time gaming content via a locally executed game application (such as game application 144 of FIG. 1 or game application 368 of FIG. 3), or alternatively may receive the real-time gaming content from a game streaming service (such as game streaming service 120 of FIG. 1). The routine then proceeds to block 510.

At block 510, the gaming device provides the real-time gaming content to a remote RIA system for distribution to a plurality of client devices in order to "stream" the game session to multiple remote audience users associated with those client devices. The routine proceeds to block 515.

At block 515, the gaming device executes a local instance of an RIA application. In certain embodiments, the execution of the RIA application may be performed in response to one or more interactions of a player user associated with the gaming to device, may be performed based on one or more preferences of the player user, or based on some other criteria.

Once the RIA application has been executed by the gaming device, the routine proceeds to block 520, in which the gaming device (via the local RIA application) provides information indicative of an audience input solicitation to the remote RIA system. In various embodiments and scenarios, the provision of the audience input solicitation may be triggered based on a variety of criteria, as described in greater detail herein. The routine proceeds to block 525.

At block 525, the gaming device receives from the remote RIA system information indicative of an aggregated game action generated by the remote RIA system based on proposed game inputs provided by multiple of the client devices responsive to the audience input solicitation. The routine then proceeds to block 530, in which the gaming device takes one or more actions responsive to the indicated aggregated game action. For example, in certain embodiments, such actions may include to implement and respond to the aggregated game action as if the aggregated game action was performed by a player user associated with the gaming device, or to display one or more audiovisual indications of the aggregated game action to the player user.

After block 530, the routine returns to block 520 in order to await triggering criteria for providing a subsequent audience input solicitation to the remote RIA system.

Figure 6:
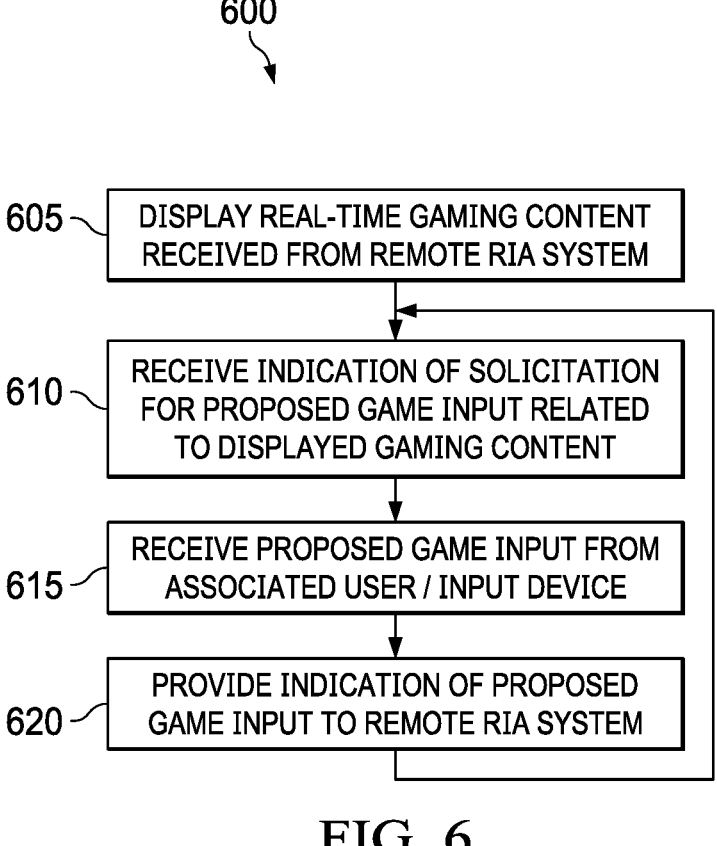
FIG. 6 is a block diagram illustrating an overview of operations of one or more example client computing systems communicatively coupled to an RIA system in accordance with one or more embodiments.

FIG. 6 is a block diagram illustrating an operational routine 600 of an example client device communicatively coupled to an embodiment of an RIA system in accordance with one or more techniques described herein. The routine may be performed, for example, by one of client devices 180 in FIG. 1, by one of the audience client computing systems 380 of FIG. 3, or some other client device.

The routine 600 begins at block 605, in which the client device displays real-time gaming content received from the remote RIA system. As detailed herein, the real-time gaming content may originate from a remote gaming device associated with a player user of the remote gaming device that is streaming the player's game session.

The routine then proceeds to block 610, in which the client device receives information indicative of an audience input solicitation for proposed game input related to the displayed real-time gaming content.

At block 615, the client device receives a proposed game input from a user associated with the client device, such as via one or more input devices communicatively coupled to the client device. The routine then proceeds to block 620, in which the client device provides information indicative of the proposed game input to the remote RIA system, such as to use as a basis for the remote RIA system to generate an aggregated game action.

Following block 620, the routine returns to block 610 to await a subsequent solicitation for additional proposed game inputs.

As used herein, the term "user" may refer to any human operator of a device or system described in the present disclosure. The term "selecting," when used herein in relation to one or more elements of a graphical user interface or other electronic display, may include various user actions taken with respect to various input control devices depending on the client computing device used to interact with the display, such as one or more clicks using a mouse or other pointing device, one or more tapping interactions using a touch screen of a client device, etc. In addition, such selecting may additionally comprise interactions with various physical actuators capable of generating electrical or electronic signal as a result of such interactions. A nonexclusive list of examples of such actuators include electronic, mechanical or electromechanical implementations of keys, buttons, pressure plates, paddles, pedals, wheels, triggers, slides, touchpads, or other touch- or motion-sensitive element, and may be digital or analog in nature. Also as used herein, unless specifically disclaimed any notification, such as an indication of an audience input solicitation or other notification, may incorporate visual, auditory, haptic, or other information conveyed to a user.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
providing, by a first server, audiovisual content for real-time display at each of a plurality of client devices that are each associated with a respective audience user, the audiovisual content being based at least in part on interactions of a first user with a remote device;
receiving, by the first server and during the real-time display, an indication of multiple proposed inputs, the multiple proposed inputs including one or more proposed inputs from each of multiple client devices of the plurality of client devices;
generating, by the first server, an aggregated action based at least in part on the multiple proposed inputs, wherein generating the aggregated action comprises determining a focal point for each of one or more clusters of the proposed inputs; and
providing, by the first server, an indication of the aggregated action to the remote device.

2. The method of claim 1, wherein providing the audiovisual content for real-time display includes providing an indication of at least some of the multiple proposed inputs.

3. The method of claim 2, wherein providing an indication of at least some of the multiple proposed inputs includes providing information indicative of a heat map based at least in part on at least some of the multiple proposed inputs.

4. The method of claim 1, further comprising causing presentation of an interface for selecting a proposed input to overlay the audiovisual content.

5. The method of claim 1, further comprising at least one of clustering the proposed inputs, applying a cluster selection to the proposed inputs and applying a cluster centroid calculation on the proposed inputs.

6. The method of claim 1, wherein the audiovisual content is received from the remote device and generated by an instance of an application being executed by the remote device.

7. The method of claim 1, wherein the audiovisual content is received from a second server and generated by an instance of an application executing on the second server.

8. The method of claim 1, wherein providing the audiovisual content for real-time display at the plurality of client devices includes modifying the audiovisual content to include the indication of the aggregated action.

9. The method of claim 1, further comprising implementing, by the remote device, one or more actions with respect to the audiovisual content responsive to the indication of the aggregated action.

10. A method comprising:
providing, by a first device, indications of one or more interactions of a first user with the first device as part of distributing audiovisual content generated by an application for real-time display to a plurality of client devices;
receiving, by the first device, an indication of an aggregated action that is based at least in part on one or more focal points that are each associated with a respective cluster of multiple proposed inputs, each proposed input received from one of multiple audience users that are associated with the plurality of client devices; and
implementing, by the first device, one or more actions for execution of the application responsive to the indication of the aggregated action.

11. The method of claim 10, further comprising receiving the audiovisual content from a server executing the application for real-time display of the audiovisual content to the first user.

12. The method of claim 10, wherein implementing the one or more actions includes performing the aggregated action with respect to the application as if the aggregated action had been performed by the first user.

13. The method of claim 10, further comprising generating the audiovisual content by locally executing the application on the first device.

14. The method of claim 10, wherein receiving the indication of the aggregated action is performed via a remote input aggregation application executing at the first device, and wherein the method further comprises initiating execution of the remote input aggregation application in response to a request from the first user.

15. The method of claim 10, wherein implementing the one or more actions includes displaying one or more interface elements indicative of the aggregated action to the first user.

16. The method of claim 10, further comprising displaying to the first user one or more interface elements indicative of at least one of the one or more clusters.

17. A system, comprising:

a content streaming manager to provide audiovisual content for real-time display at each of a plurality of client devices that are each associated with a respective audience user, wherein the audiovisual content is based at least in part on interactions of a first user with a first device;

a user input manager to receive, during the real-time display, an indication of multiple proposed inputs, the multiple proposed inputs including one or more proposed inputs from each of multiple client devices of the plurality of client devices; and an input aggregation manager to generate an aggregated action based at least in part on determining a focal point for each of one or more clusters of the multiple proposed inputs, and to provide an indication of the aggregated action to the first device.

18. The system of claim 17, wherein to provide the audiovisual content for real-time display includes to provide an indication of at least some of the multiple proposed inputs.

19. The system of claim 17, wherein the content streaming manager is further to receive the audiovisual content from the first device, and wherein the audiovisual content is generated by an instance of an application being executed by the first device.

20. The system of claim 17, wherein the content streaming manager is further to receive the audiovisual content from a server, and wherein the audiovisual content is generated by an instance of an application being executed by the server.

21. The system of claim 17, wherein to provide the audiovisual content for real-time display includes to modify the audiovisual content to include an indication of the aggregated action.

22. The system of claim 17, wherein to provide the indication of at least some of the multiple proposed inputs includes to provide information indicative of a heat map based at least in part on the at least some proposed inputs.

23. A server, comprising:

one or more processors; and a memory storing a set of executable instructions, the set of executable instructions to manipulate the one or more processors to:

provide audiovisual content for real-time display at each of a plurality of client devices that are each associated with a respective audience user, wherein the audiovisual content is based at least in part on interactions of a first user with a first device;

receive, during the real-time display of the audiovisual content, an indication of multiple proposed inputs, the multiple proposed inputs including one or more proposed inputs from each of multiple client devices of the plurality of client devices;

generate an aggregated action based at least in part on a determined focal point for each of one or more clusters of the multiple proposed inputs; and provide an indication of the aggregated action to the first device.

24. The server of claim 23, wherein to provide the audiovisual content for real-time display includes to provide an indication of at least some of the multiple proposed inputs.

25. The server of claim 24, wherein to provide an indication of at least some of the multiple proposed inputs includes to provide information indicative of a heat map based at least in part on the at least some proposed inputs.

26. The server of claim 23, wherein the audiovisual content is received from the first device and generated by an instance of an application being executed by the first device.

27. The server of claim 23, wherein the audiovisual content is received from a server and generated by an instance of an application executing on the server.

28. The server of any claim 23, wherein to provide the audiovisual content for real-time display includes to modify the audiovisual content to include an indication of the aggregated action.

29. A device, comprising:

one or more processors; and a memory storing a set of executable instructions, the set of executable instructions to manipulate the one or more processors to:

provide indications of one or more interactions of a first user with the device as part of distributing audiovisual content generated by an application for real-time display to a plurality of client devices;

receive an indication of an aggregated action that is based at least in part on a focal point for each of one or more determined clusters of multiple proposed inputs, each proposed input from one of multiple audience users associated with the plurality of client devices; and implement one or more actions for execution of the application responsive to the indication of the aggregated action.

30. The device of claim 29, wherein the set of executable instructions is further to generate the audiovisual content by locally executing the application on the device.

31. The device of claim 29, wherein the set of executable instructions is further to receive the audiovisual content from a server executing the application for real-time display of the audiovisual content to the first user.

32. The device of claim 29, wherein the indication of the aggregated action is received via an input aggregation application executing at the device, and wherein the set of executable instructions is further to initiate execution of the input aggregation application in response to a request from the first user.

33. The device of claim 29, wherein to implement the one or more actions includes to display one or more interface elements indicative of the aggregated action to the first user.

34. The device of claim 29, wherein the set of executable instructions is further to display to the first user one or more interface elements indicative of at least some of the multiple proposed inputs.

35. The device of claim 29, wherein to implement the one or more actions includes to perform the aggregated action with respect to the application as if the aggregated action had been performed by the first user.

* * * * *